US008897004B2

(12) United States Patent
Ruch et al.

(10) Patent No.: US 8,897,004 B2
(45) Date of Patent: Nov. 25, 2014

(54) EJECTION MECHANISMS FOR COMPUTER EQUIPMENT (75) Inventors: Mark H. Ruch, The Woodlands, TX (US); Earl W. Moore, Cypress, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 640 days.

(21) Appl. No.: 12/867,689

(22) PCT Filed: Apr. 29, 2008

(86) PCT No.: PCT/US2008/061871
§ 371 (c)(1),
(2), (4) Date: Aug. 13, 2010

(87) PCT Pub. No.: WO2009/134245
PCT Pub. Date: Nov. 5, 2009

(65) Prior Publication Data
US 2010/0328876 A1 Dec. 30, 2010

(51) Int. Cl.
*G06F 1/16* (2006.01)
*G06F 1/18* (2006.01)

(52) U.S. Cl.
CPC .............. *G06F 1/1632* (2013.01); *G06F 1/187* (2013.01); *G06F 1/16* (2013.01)
USPC .................................. 361/679.41; 312/293.1

(58) Field of Classification Search
CPC ............ G06F 19/3456; G06F 19/3462; G06F 17/30312; G06F 1/1684; G06F 1/16; G06F 13/4081; G06F 1/187; G06F 3/0625; G06F 3/0634; G06F 3/0677; H05K 3/284; H05K 5/00; H05K 5/0247; H05K 7/00
USPC ............ 361/679.01, 679.02, 679.21, 679.26, 361/679.32–679.39, 679.41, 724–727; 312/1–223, 293.1; 74/523, 491
See application file for complete search history.

(56) References Cited

U.S. PATENT DOCUMENTS

| 5,373,419 | A | * | 12/1994 | Wright | .......................... 361/755 |
| 5,629,836 | A | * | 5/1997 | Wright | .......................... 361/755 |
| 5,971,780 | A | * | 10/1999 | Youn | .............................. 439/160 |
| 6,064,568 | A | * | 5/2000 | Schmitt | ..................... 361/679.31 |

(Continued)

FOREIGN PATENT DOCUMENTS

| JP | 1992-0600802 | 2/1992 |
| JP | 1994-002753 U | 1/1994 |

(Continued)

OTHER PUBLICATIONS

Intellectual Property Office, Examination Report under Section 18(3), Appln No. 1015532,3, date of maiing Jan. 30, 2012, 2 p.

(Continued)

*Primary Examiner* — Anthony Haughton
*Assistant Examiner* — Ingrid Wright (57) ABSTRACT In one embodiment, an ejection mechanism for ejecting a removable module from a piece of equipment includes a two-part ejection lever including a first lever portion that is snap fit to a second lever portion, wherein the first lever portion can separate from the second portion when a user pulls on the ejection lever in an attempt to eject the removable module when the module has been locked within the equipment.

22 Claims, 5 Drawing Sheets

(56) References Cited

U.S. PATENT DOCUMENTS

| | | |
|---|---|---|
| 6,483,107 B1 | 11/2002 | Rabinovitz et al. |
| 6,510,051 B2 * | 1/2003 | Kim .................. 361/679.43 |
| 6,802,448 B2 * | 10/2004 | Bricaud et al. ............. 235/451 |
| 6,916,190 B2 | 7/2005 | Joist |
| 7,251,132 B1 | 7/2007 | Paul et al. |
| 7,351,090 B1 | 4/2008 | Moore |
| 7,934,936 B2 * | 5/2011 | Yang ........................ 439/157 |
| 2001/0055200 A1 | 12/2001 | Omori |
| 2005/0014403 A1 | 1/2005 | Joist |
| 2006/0028805 A1 * | 2/2006 | Hidaka ..................... 361/754 |
| 2007/0133188 A1 * | 6/2007 | Su ............................. 361/803 |
| 2008/0266781 A1 * | 10/2008 | Olesiewicz et al. ......... 361/685 |

FOREIGN PATENT DOCUMENTS

| | | |
|---|---|---|
| JP | 1994-083484 | 3/1994 |
| JP | 08152937 | 6/1996 |
| JP | 2000-322801 | 11/2000 |
| JP | 2001-176165 | 6/2001 |
| JP | 2004-176783 | 6/2004 |
| TW | M279062 | 10/2005 |
| TW | 200818613 A | 4/2008 |
| WO | WO-2008033295 A2 | 3/2008 |

OTHER PUBLICATIONS

International Searching Authority, International Search Report & Written Opinion dated Dec. 26, 2008, pp. 10.

DE Office Action, Appln No. 112008003828.7, date of mailing Jul. 12, 2011, 8 p.

Translation of DE Office Action, Appln No. 112008003828.7, date of mailing Jul. 12, 2011, 3 p.

Taiwan office action cited in Taiwan Appl. No. 98110403 dated Mar. 27, 2014; 9 pages.

* cited by examiner

EJECTION MECHANISMS FOR COMPUTER EQUIPMENT

BACKGROUND

Some computer equipment comprises removable modules. For example, notebook computers and notebook computer docking stations can include removable storage drives. As a security feature, such computer equipment often further includes feature, such as a key lock, that secures the removable module in place to prevent theft.

When a removable module has been locked within a piece of computer equipment, the locked state may not be readily apparent to the observer. Therefore, the equipment owner or another, such as a thief, may attempt to eject the module using an ejection lever provided on the equipment. In such a situation, the lever will not pivot as it does when the module is unlocked. If the person attempting to eject the module does not appreciate that fact, he or she may continue to pull on the lever with increased force under the belief that the module will eject if the lever is pulled hard enough. Unfortunately, if undue force is applied to the lever, the lever may break, in which case the module cannot be removed even when unlocked and the lever must be replaced to enable such removal.

BRIEF DESCRIPTION OF THE DRAWINGS

The disclosed ejection mechanisms can be better understood with reference to the following drawings. The components in the drawings are not necessarily to scale.

DETAILED DESCRIPTION

As described above, an ejection lever can break when one attempts to eject a removable module that has been locked within computer equipment. Disclosed in the following is an ejection mechanism designed to reduce the likelihood of such breakage. In some embodiments, the ejection mechanism comprises a two-part, snap-fit ejection lever that is used to eject a removable module. When the module is unlocked, the ejection lever operates in similar manner to a conventional ejection lever. When the removable module is locked, however, and undue force is applied to the lever in an attempt to remove the module the two parts of the lever separate. In addition to preventing breakage of the lever, such separation provides a clear indication to the user that the module is locked and presently cannot be removed using the lever.

Figure 1:
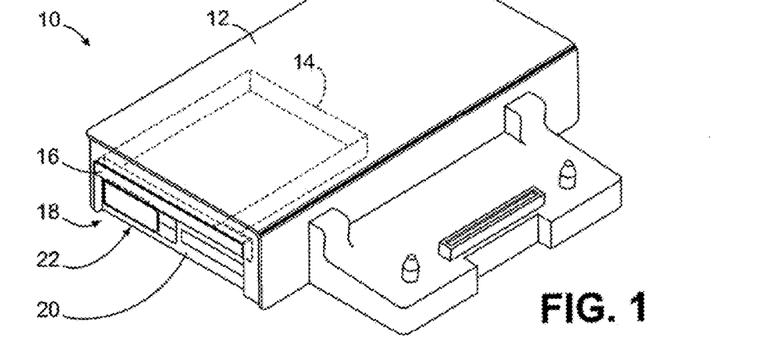
FIG. 1 is a perspective view of a piece of computing equipment that incorporates a removable module that can be ejected using an ejection mechanism, the ejection mechanism being shown in a first orientation.

Referring now in more detail to the drawings in which like numerals indicate corresponding parts throughout the views, FIG. 1 illustrates a piece of computer equipment 10 in the form of a notebook computer docking station. Although a docking station has been explicitly illustrated and identified, it is noted that docking station is cited only as an example. Therefore, the teachings of the present disclosure equally apply to other computer equipment that comprises a removable module that can be ejected with an ejection mechanism.

As illustrated in FIG. 1, the computer equipment 10 comprises an outer housing 12 that defines an internal space or module bay 14 in which a removable module 16 can be inserted. By way of example, the module 16 comprises a storage module, such as a hard drive, optical drive, or the like. Regardless, the module 16 can be removed from the bay 14 using an ejection mechanism 18 that is accessible from a panel 20 provided on a side of the equipment 10. As is further illustrated in FIG. 1, the ejection mechanism 18 includes an ejection lever 22 that can be pulled by a user to at least partially eject the module 16. In FIG. 1, the ejection lever 22 is in a first or closed orientation in which an outer surface of the lever is generally parallel to and/or flush with the panel 20.

Figure 2:
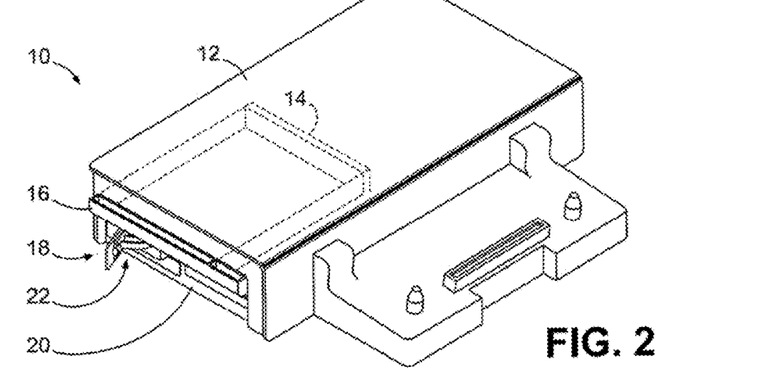
FIG. 2 is a further perspective view of the computing equipment of FIG. 1 with the ejection mechanism shown in a second orientation.

Ejection of the removable module 16 is illustrated in FIG. 2. As shown in that figure, the ejection lever 22 has been pulled to pivot the lever to an open orientation. Such pivoting of the lever 22 causes an internal carriage (see FIGS. 9 and 10) to partially eject the module 16 from its bay 14 so that it may be pulled out from the computer equipment 10 by the user. As indicated in FIG. 2, only a small portion of the module 16 may extend from the equipment 10 when such ejection has been achieved.

Figure 3:
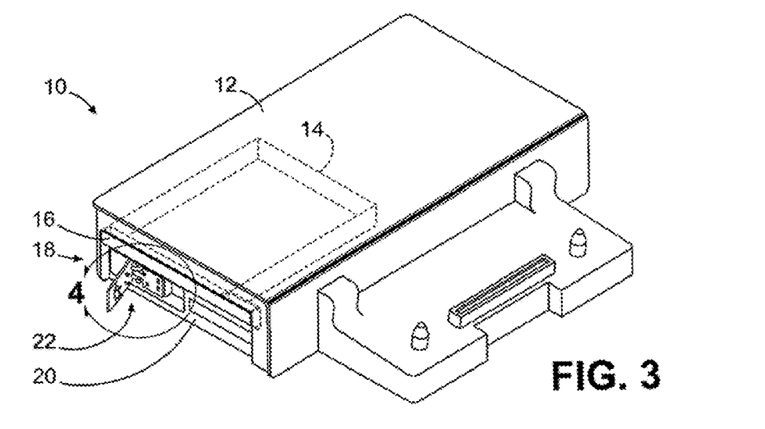
FIG. 3 is a further perspective view of the computing equipment of FIG. 1 with the ejection mechanism shown in a third orientation.
Figure 4:
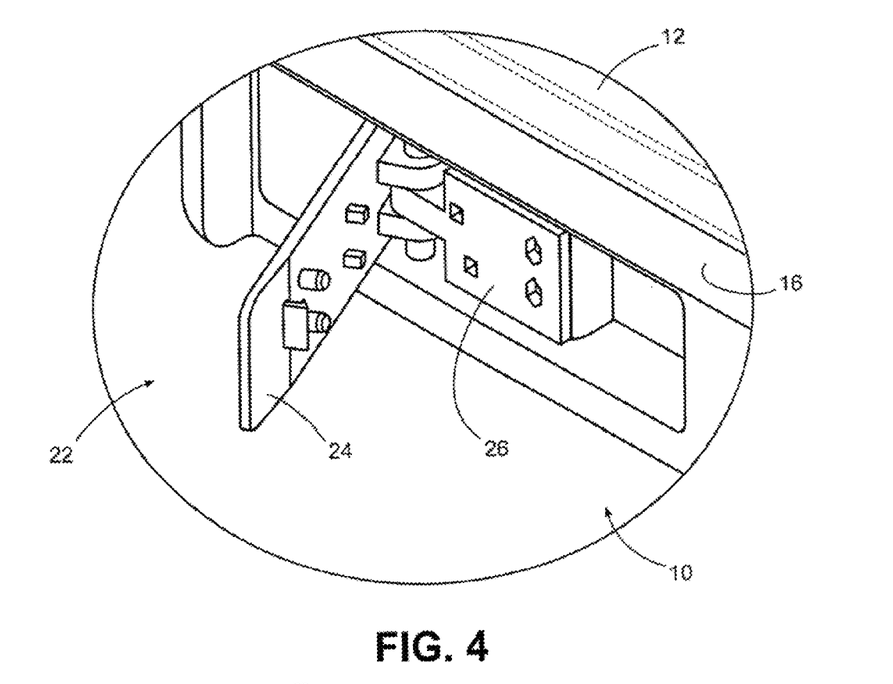
FIG. 4 is a detail view of the ejection mechanism in the third orientation shown in FIG. 3.

Referring next to FIG. 3, illustrated is the outcome of a situation in which the removable module 16 is locked within the computer equipment 10 and one has attempted to force the module out from its bay 14 by using the ejection lever 18. As shown in the detail view of FIG. 4 corresponding to FIG. 3, such action causes a first lever part or portion 24 of the lever 18 to separate from a second lever part or portion 26 of the lever such that the lever is placed in a third or separated orientation. As described above, such separation both prevents breakage of the lever 22 and provides a clear indication to the user that the module 16 is locked and cannot be removed using the lever until the module has been unlocked.

Figure 5:
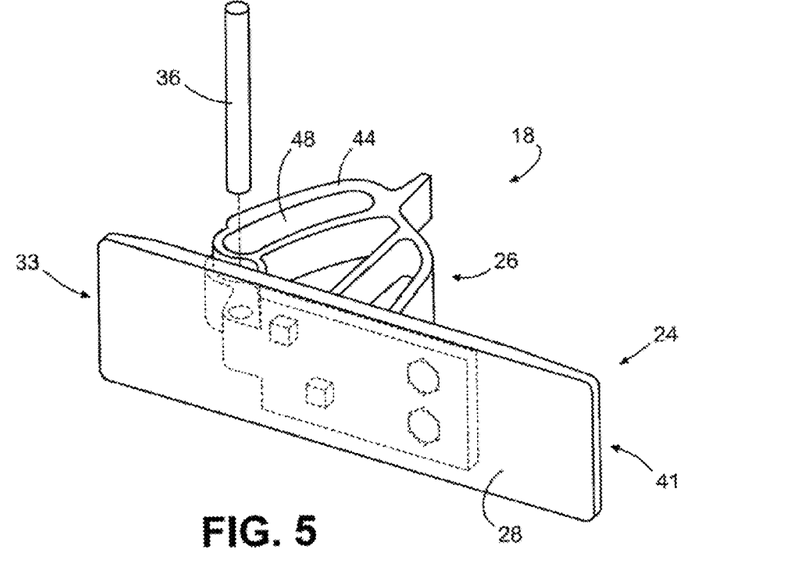
FIG. 5 is a front perspective view of an ejection lever of the ejection mechanism shown in FIGS. 1-4.
Figure 6:
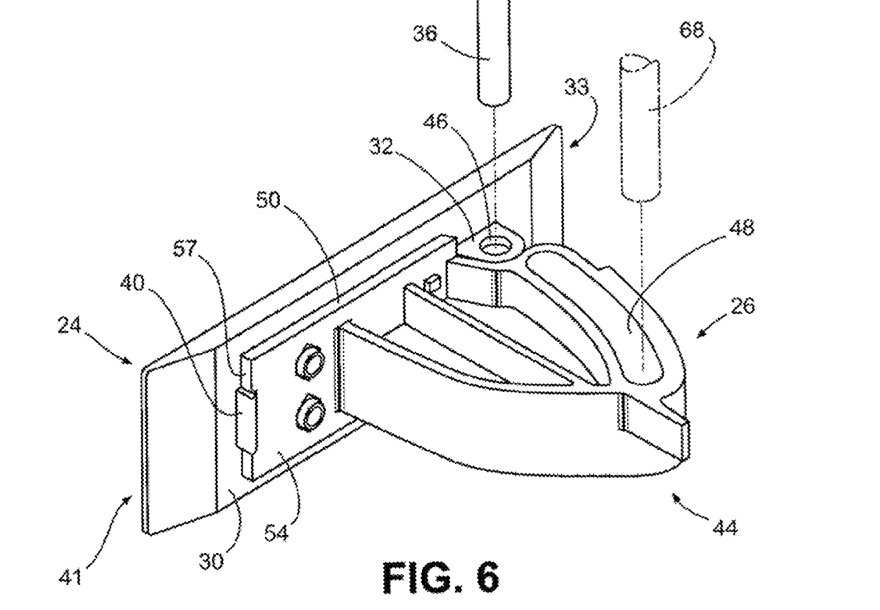
FIG. 6 is a rear perspective view of the ejection lever of FIG. 5.
Figure 7:
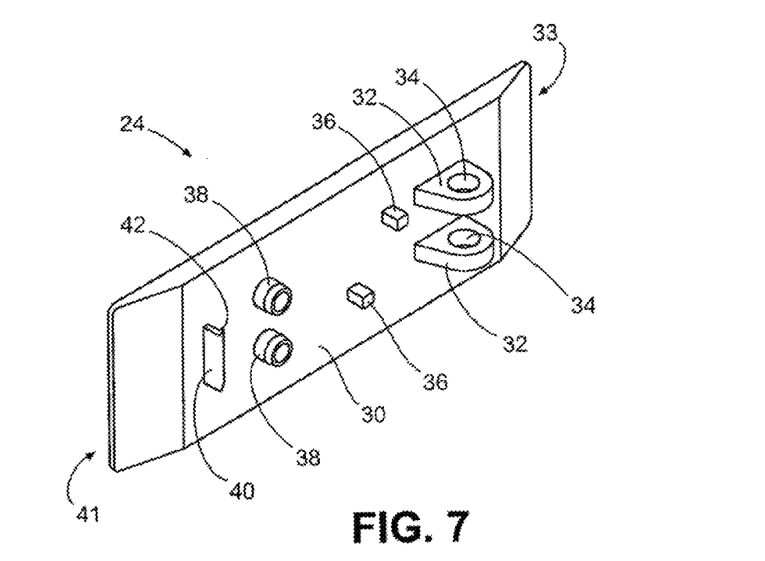
FIG. 7 is a perspective view of a first portion of the ejection lever of FIGS. 5 and 6.

FIGS. 5 and 6 illustrate the ejection lever 18 of the ejection mechanism 18. As shown in those figures, the first lever portion 24, which forms a first or outer arm portion of the lever 18, is snap fit to the second lever portion 26. The first lever portion 24 comprises a generally elongated, planar, and rectangular member that includes a first or outer surface 28 and a second or inner surface 30. With reference to FIG. 7, which illustrates the first lever portion 24 independent of the second lever portion 26, various features are provided on the inner surface 30. In the illustrated embodiment, those features include pivot pin supports 32 that extend out from the inner surface 30 adjacent a first or proximal edge 33 of the first lever portion 24. The supports 32 each comprise an opening 34 through which a pivot pin 36 (FIGS. 5 and 6) can pass. As described below, the first lever portion 24, and the ejection lever 22 generally, can be pivoted about the pivot pin 36 during operation of the lever.

With further reference to FIG. 7, the first lever portion 24 also includes snap elements that extend out from the inner surface 30 adapted for receipt by the second lever portion 26. In the illustrated embodiment, the snap elements include two block-shaped snap elements 36 and two cylindrical snap elements 38. Furthermore, the snap elements include a latch element 40 that extends out from the surface 30 adjacent a second or distal edge 41. As shown in FIG. 7, the latch element 40 comprises a lip 42 that, as described below, grips the second lever portion 26 when the first and second lever portions are coupled together.

With reference back to FIGS. 5 and 6, the second lever portion 26 forms a body 44 of the ejection lever 22. As indicated most clearly in FIG. 8, which illustrates the second lever portion 26 independent of the first lever portion 24, the body 44 includes an opening 46 through which the pivot pin 36 can pass. As is apparent from FIG. 6, the portion of the body 44 that comprises the opening 46 is sized and configured to fit between the pivot pin supports 32 of the first lever portion 24 such that the pin 36 can be simultaneously passed through both the first and second lever portions such that both portions are pivotally mounted to the pin and can pivot about a pivot axis defined by a longitudinal axis of the pin. The body 44 of the second lever portion 26 also comprises a cam slot 48 that is adapted to receive a cam follower of the internal carriage mentioned in the foregoing. As described below, pivoting of the second lever portion 26, and the ejection lever 18 generally, causes the cam follower of the carriage to move along the cam slot 48, which results in displacement of the carriage and ejection of the removable module 16 when it is unlocked.

Figure 8:
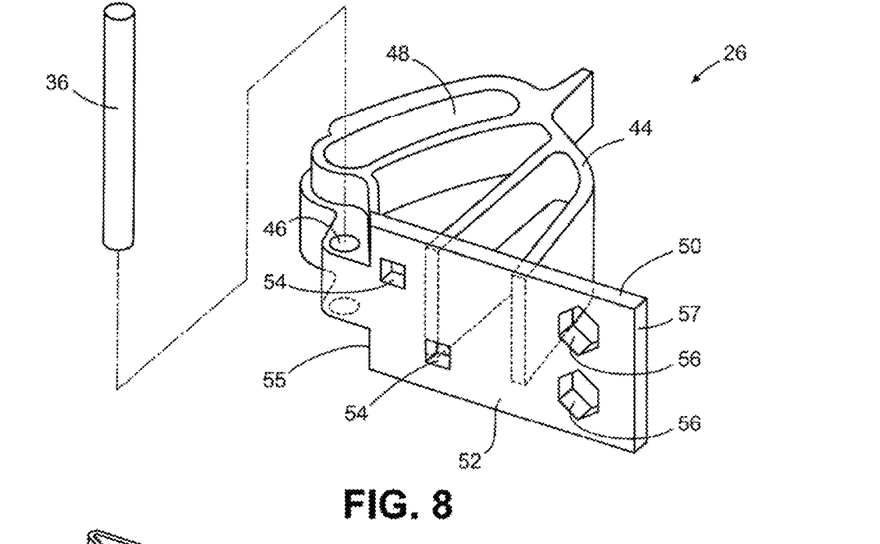
FIG. 8 is a perspective view of a second portion of the ejection lever of FIGS. 5 and 6.

With specific reference to FIGS. 6 and 8, the second lever portion 26 also forms a second or inner arm portion 50 of the ejection lever 22. Like the first lever portion 24 (which forms an outer arm portion), the inner arm portion 50 is generally elongated, planar, and rectangular, although the inner arm portion is shorter in length that the first lever portion. In some embodiments, the inner arm portion 50 is unitarily formed with the body 44 as a single piece of material. As shown in FIGS. 6 and 8, the inner arm portion 50 comprises a first or outer surface 52 and a second or inner surface 54. Extending through the inner arm portion 50 between those two surfaces 52, 54 are openings that are adapted to receive the snap elements of the first lever portion 24. In the illustrated embodiment, those openings include square openings 54 positioned adjacent a first or proximal edge 55 of the inner arm portion 50 that are adapted to receive the block-shaped snap elements 36 of the first lever portion 24. In addition, the openings include hexagonal openings 56 positioned adjacent a second or distal edge 57 of the inner arm portion 50 that are adapted to receive the cylindrical snap elements 38 of the first lever portion 24. FIG. 6 shows the first and second lever portions 24, 26 coupled together such that the snap elements 36, 38 have been snapped into place within the openings 54, 56. When the first and second lever portions 24, 26 are so coupled, the latch element 40 of the first lever portion 24 securely latches to the distal edge 57 of the inner arm portion 50. As is further illustrated in FIG. 6, the inner surface 30 of the first lever portion 24 and the outer surface 52 of the inner arm portion 50 of the second lever portion 26 are placed in contact or at least close proximity when the two lever portions are coupled.

Figure 9:
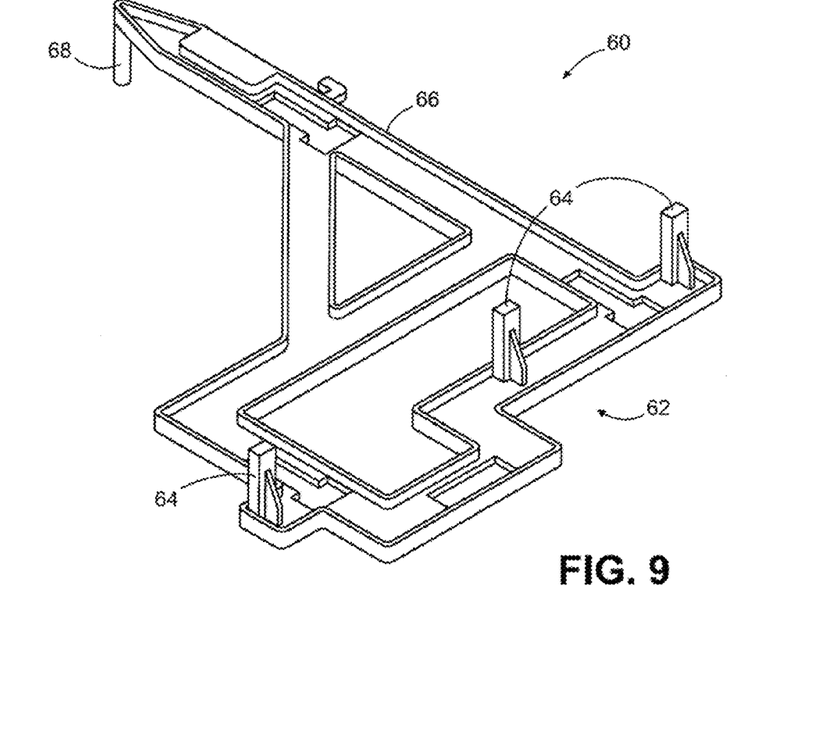
FIG. 9 is a perspective view of an internal carriage of the computer equipment of FIGS. 1-3 used in conjunction with the ejection lever of FIGS. 5 and 6.

Referring next to FIG. 9, the aforementioned internal carriage 60 is illustrated. The carriage 60 forms part of the ejection mechanism 18 and therefore is used in conjunction with the ejection lever 22 to eject the removable module 16. In the illustrated embodiment, the carriage 60 is adapted to fit below the module 16 within the computer equipment housing 12 and comprises a body 62 that supports upwardly extending vertical posts 64 that are used to urge the module out from the housing. Specifically, the posts 64 lie behind a rear edge of the module 16 and are pressed into contact with that edge when the carriage 60 is moved in an outward (ejection) direction by the ejection lever 22. The carriage 60 further includes an armature 66 that extends forwardly from the body 62. The armature 66 comprises a cam follower 68 that is adapted for receipt within the cam slot 48 of the second lever portion 26.

Figure 10A:
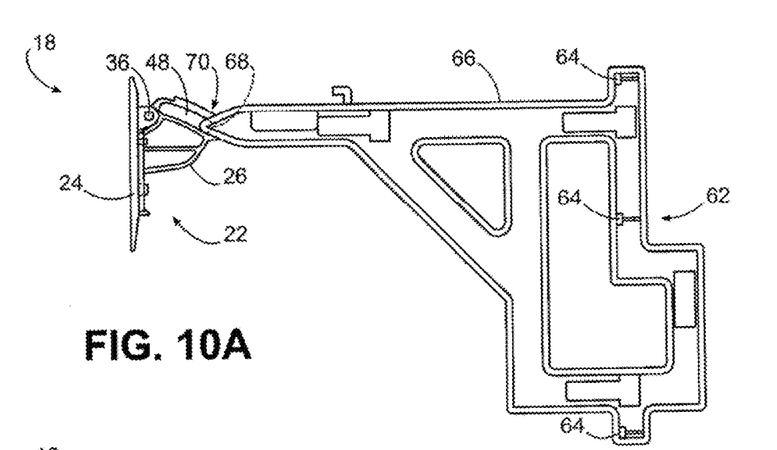
FIG. 10A is a top view of the ejection lever of FIGS. 5 and 6 and the carriage of FIG. 9 while in the first orientation illustrated in FIG. 1.
Figure 10B:
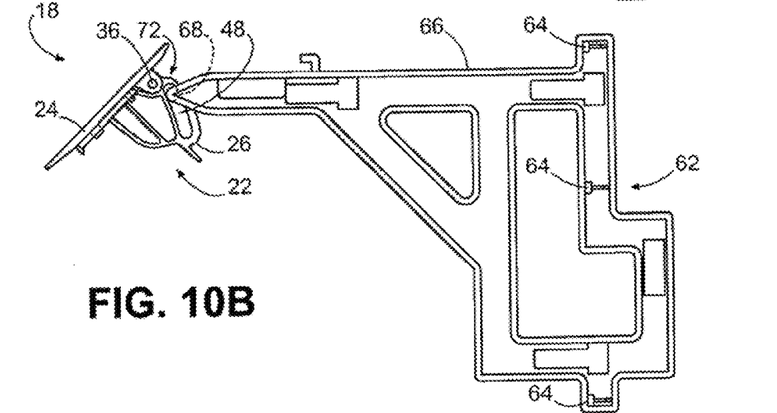
FIG. 10B is a top view of the ejection lever of FIGS. 5 and 6 and the carriage of FIG. 9 while in the second orientation illustrated in FIG. 2.

Referring now to FIGS. 10A and 10B, illustrated is normal operation of the ejection mechanism 18. Beginning with FIG. 10A, the removable module (omitted for clarity) is retracted within the computer equipment housing (also omitted) and the ejection lever 22 is in the closed orientation in which the lever is not being pulled by a user. As is apparent in FIG. 10A, the cam follower 68 of the carriage 60 is positioned at a first end 70 of the cam slot 48 in that orientation. In FIG. 10B, however, the ejection lever 22 has been pulled to pivot the lever about the pin 36 into the opened orientation. In FIG. 10B it is assumed that the removable module is unlocked and therefore can be ejected. Accordingly, the carriage 60 is free to move and has been displaced to the left in the orientation of the figure due to displacement of the cam follower 68 resulting from displacement of the cam slot 48 from pivoting of the lever 22. As shown in FIG. 10B, the cam follower 68 has been shifted to a second end 72 of the cam slot 48.

Figure 10C:
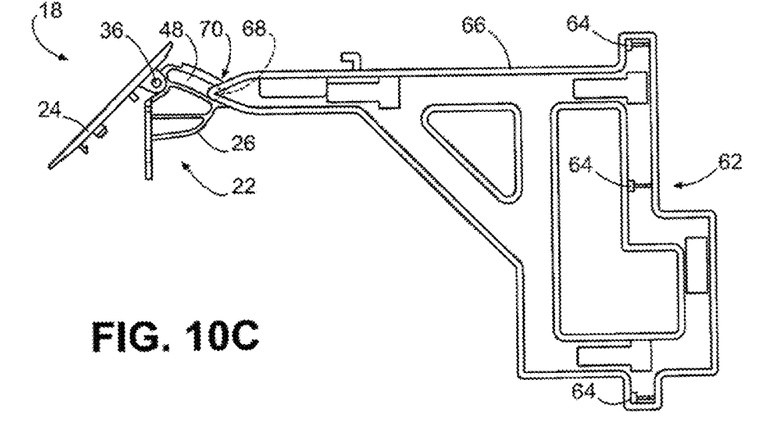
FIG. 10C is a top view of the ejection lever of FIGS. 5 and 6 and the carriage of FIG. 9 while in the third orientation illustrated in FIG. 3.

Referring next to FIG. 10C, it is assumed that the removable module is locked and, therefore, the carriage 60 cannot eject the module from the computer equipment housing. In such a case, the ejection lever 18, which is coupled to the carriage 60 by way of the carriage cam follower 68, cannot be pivoted as a single, integrated component about the pivot pin 36. If the user attempts to force the lever 22 to pivot in such a situation, and applies undue force to the lever, the first lever portion 24 will separate or break away from the second lever portion 26 as illustrated in FIG. 10C. As shown in that figure, the first lever portion 24 has been pivoted about the pin 36, but the second pivot pin 26 has remained in closed orientation. Such separation results from the latch element 40 of the first lever portion 24 losing its grip on the distal edge 57 of the second lever portion 26 due to flexion of the first lever portion and the snap elements 36, 38 of the first lever portion subsequently being pulled out from the openings 54, 56 provided in the second lever portion. In some embodiments, the force required to separate the first and second lever portions is significantly greater than the force required to eject the removable module when it is unlocked but significantly less than the force required to damage either lever portion.

Because the first lever portion 24 breaks away from the second lever portion 26, damage to the lever 22 is prevented. Because the first lever portion 24 can be recoupled to the second lever portion 26 by snapping the first lever portion back into place on the second lever portion, the lever 22 is resettable and need not be replaced after separation. In some embodiments, separation of the first lever portion 24 from the second lever portion 26 is abrupt and accompanied by a snapping sound to provide the user with both a tactile and audible indication that the removable module is locked and cannot presently be removed using the lever 22.

The invention claimed is:

1. An ejection mechanism for ejecting a removable module from a piece of equipment, the ejection mechanism comprising:
a two-part ejection lever including a first lever portion that is snap fit to a second lever portion, wherein the first lever portion can separate from the second portion when a user pulls on the ejection lever in an attempt to eject the removable module when the module has been locked within the equipment, wherein the first lever portion remains snap fit to the second lever portion during ejection of the removable module.

2. The ejection mechanism of claim 1, wherein the first lever portion forms an outer lever arm portion that can be gripped by the user.

3. The ejection mechanism of claim 1, wherein the first lever portion comprises snap elements that are received by openings provided in the second lever portion, wherein the openings abut opposite side surfaces of each of the snap elements.

4. The ejection mechanism of claim 1, wherein the first lever portion comprises a latch element that latches to the second lever portion.

5. The ejection mechanism of claim 1, wherein the first lever portion comprises a pivot pin support adapted to receive a pivot pin about which the first lever portion can pivot.

6. The ejection mechanism of claim 1, wherein the second lever portion comprises a body and an arm portion to which the first lever portion couples.

7. The ejection mechanism of claim 6, wherein the arm portion comprises openings adapted to receive snap elements of the first lever portion.

8. The ejection mechanism of claim 6, wherein the body comprises a cam slot adapted to receive a cam follower of a carriage used to urge the removable module out from the equipment.

9. The ejection mechanism of claim 1, further comprising a pivot pin to which the first and second lever portions are both independently pivotally mounted, wherein when the first lever portion is separated from the second lever portion the first lever portion pivots about the pivot pin but the second lever portion does not.

10. The ejection mechanism of claim 1, further comprising an internal carriage upon which the ejection lever pulls when the ejection lever is pulled by the user, the carriage being adapted to urge the removable module out from the equipment.

11. The ejection mechanism of claim 1, wherein the first lever portion is separable from the second lever portion while the second lever portion is stationary.

12. An ejection mechanism for ejecting a removable module from a piece of equipment, the ejection mechanism comprising:
a two-part ejection lever including a first lever portion that forms an outer arm portion that a user can pull upon and a second lever portion to which the first lever portion snap fits, the second lever portion including a body and an inner arm portion to which the first lever portion directly couples, the first lever portion comprising snap elements that can be received by openings provided in the inner arm portion and a latch element that can latch to a distal edge of the inner arm portion, the body of the second lever portion comprising a cam slot;
a pivot pin to which the first and second lever portions are both independently pivotally mounted; and
an internal carriage upon which the ejection lever pulls when the ejection lever is pulled, the carriage comprising a cam follower positioned within the cam slot of the second lever portion, the carriage being adapted to urge the removable module out from the equipment;
wherein the first lever portion can separate from the second portion when a user pulls on the ejection lever in an attempt to eject the removable module when the module has been locked within the equipment, in which case the first lever portion pivots about the pivot pin but the second lever portion does not.

13. An ejection lever for ejecting a removable module from a piece of equipment, the ejection lever comprising:
a first lever portion that forms an outer arm portion upon which a user can pull, the outer arm portion having an outer surface, an inner surface, and snap elements that extend out from the inner surface, the first lever portion further including an opening through which a pivot pin can pass; and
a second lever portion to which the first lever portion is snap fit, the second lever portion being pivotable with the first lever portion during ejection of the removable module, the second lever portion including a body and an inner arm portion to which the outer arm portion can attach, the inner arm portion comprising openings adapted to receive snap elements of the outer arm portion; wherein the first lever portion can separate from the second portion when a user pulls on the first lever portion while the second lever portion cannot pivot, wherein the first lever portion remains snap fit to the second lever portion during ejection of the removable module.

14. The ejection lever of claim 13, wherein the inner surface of the outer arm portion contacts an outer surface of the inner arm portion when the first lever portion is coupled to the second lever portion.

15. The ejection lever of claim 13, wherein the outer arm portion comprises a latch element adapted to latch to a distal edge of the inner arm portion.

16. The ejection lever of claim 13, wherein the first lever portion comprises a pivot pin support adapted to receive the pivot pin and wherein the body of the second lever portion comprises an opening also adapted to receive the pivot pin.

17. The ejection lever of claim 13, wherein the body comprises a cam slot adapted to receive a cam follower of a carriage used to urge the removable module out from the equipment.

18. Computer equipment comprising:
an outer housing that includes a module bay;
a removable module that can be inserted into and ejected from the bay; and
an ejection mechanism for ejecting the removable module from the bay, the ejection mechanism including a two-part ejection lever including a first lever portion that is snap fit to a second lever portion, wherein the first lever portion can separate from the second portion when a user pulls on the ejection lever in an attempt to eject the removable module when the module has been locked within the computer equipment and wherein the first lever portion is snap fit to the second lever portion such that the first lever portion and the second lever portion remained snap fit together during ejection of the removable module.

19. The equipment of claim 18, further comprising a pivot pin to which the first and second lever portions are both independently pivotally mounted, wherein when the first lever portion is separated from the second lever portion the first lever portion pivots about the pivot pin but the second lever portion does not.

20. The equipment of claim 18, further comprising an internal carriage upon which the ejection lever pulls when the ejection lever is pulled by the user, the carriage being adapted to urge the removable module out from the equipment.

21. The equipment of claim 18, wherein the equipment comprises a notebook computer docking station.

22. An ejection mechanism for ejecting a removable module from a piece of equipment, the ejection mechanism comprising:

a two-part ejection lever including a first lever portion that is snap fit to a second lever portion, wherein the first lever portion can separate from the second portion when a user pulls on the ejection lever in an attempt to eject the removable module when the module has been locked within the equipment, wherein the first lever portion and the second lever portion pivot about a single axis when the module is unlocked with respect to the equipment.

* * * * *